United States Patent [19]

Beckum et al.

[11] Patent Number: 5,137,440
[45] Date of Patent: Aug. 11, 1992

[54] BRUSH CLEANING MECHANISM FOR SOAP MOLDING MACHINES

[75] Inventors: Leroy Beckum, Lady Lake, Fla.; Dwyane Watson, Cincinnati, Ohio

[73] Assignee: The Andrew Jergens Co., Cincinnati, Ohio

[21] Appl. No.: 646,240

[22] Filed: Jan. 28, 1991

[51] Int. Cl.$^5$ .............................................. B29C 33/72
[52] U.S. Cl. ................................ 425/225; 15/159 A; 425/226; 425/227; 425/229; 425/231
[58] Field of Search ............................. 425/225–229, 425/231; 15/159 A, 159 R

[56] References Cited

U.S. PATENT DOCUMENTS

| | | | |
|---|---|---|---|
| 3,010,173 | 11/1961 | Culver | 425/227 X |
| 3,059,305 | 10/1962 | Brozdowicz | 425/228 X |
| 3,840,224 | 10/1974 | Zawiski | 15/159 A X |
| 4,616,374 | 10/1986 | Novogrodsky | 15/159 A X |

FOREIGN PATENT DOCUMENTS

| | | | |
|---|---|---|---|
| 45-23582 | 8/1970 | Japan | 425/227 |
| 61-31219 | 2/1986 | Japan | 425/229 |
| 8805463 | 7/1988 | World Int. Prop. O. | 425/225 |

Primary Examiner—Richard L. Chiesa
Attorney, Agent, or Firm—Kinney & Schenk

[57] ABSTRACT

A turret type soap molding machine has a cleaning station at which soap residue is removed from mold cavities. The cleaning station includes reciprocating brushes for cleaning the surfaces of the mold cavities.

7 Claims, 4 Drawing Sheets

U.S. Patent  Aug. 11, 1992  Sheet 1 of 4  5,137,440
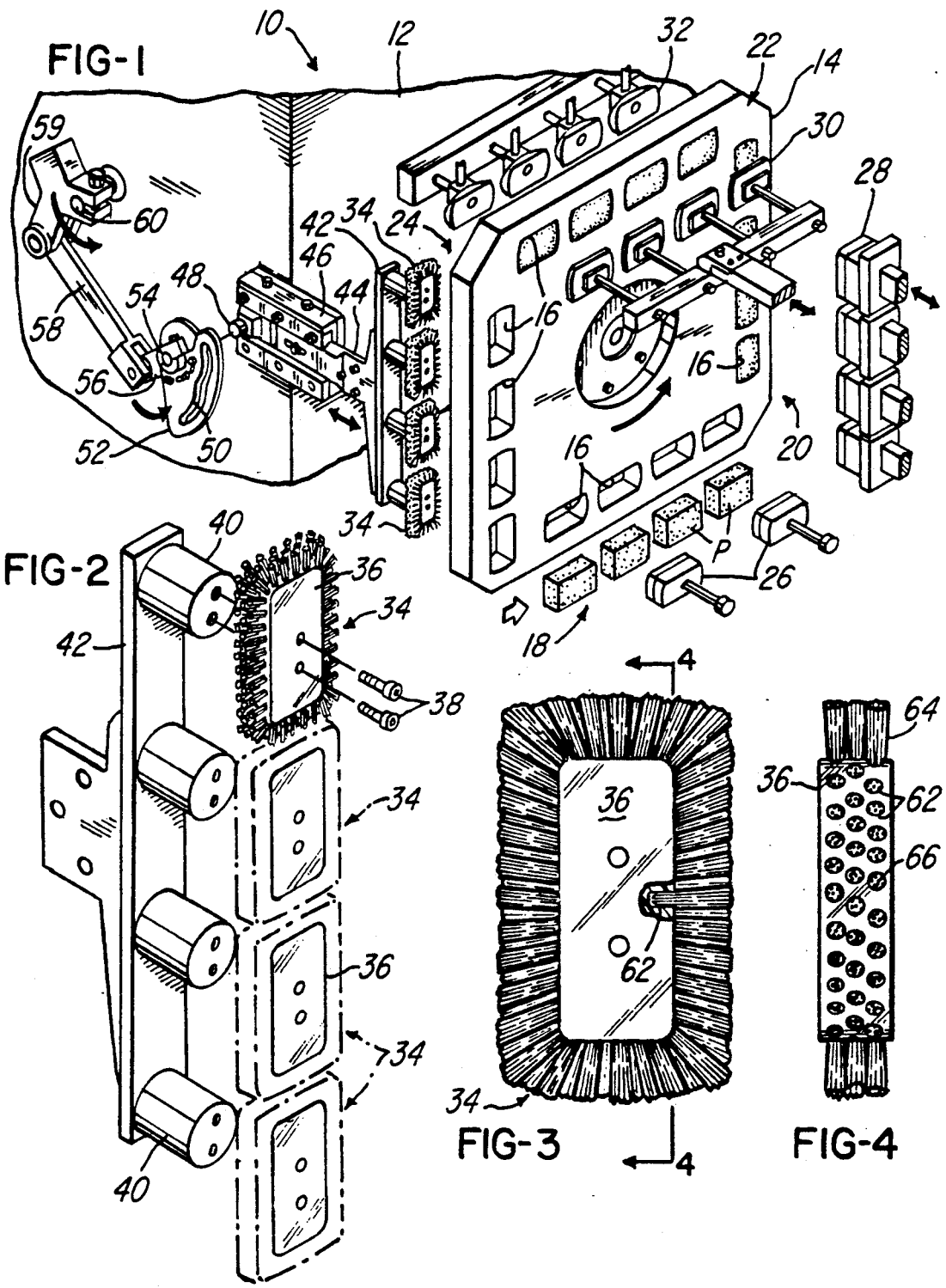

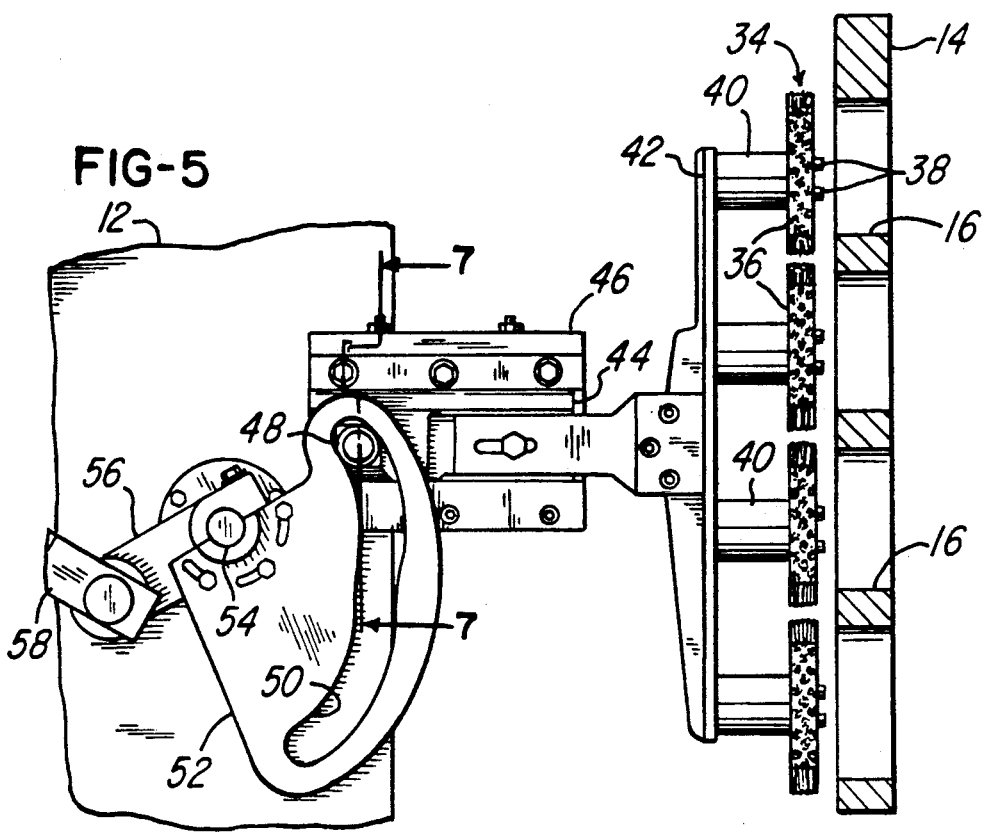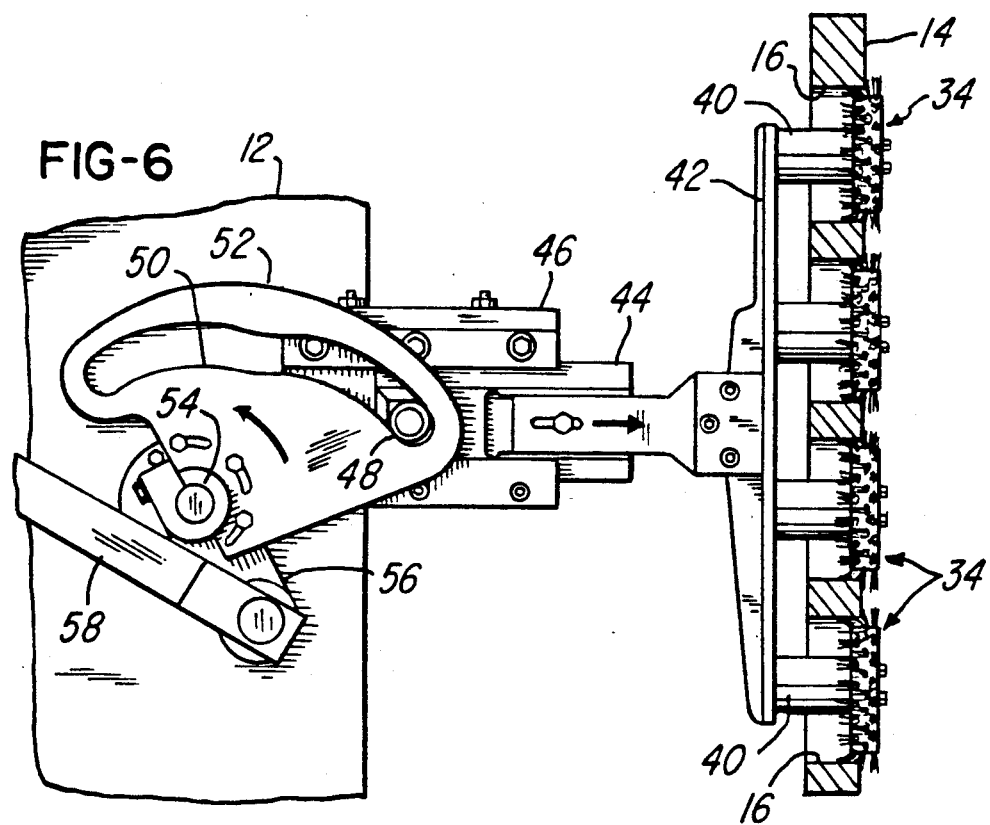

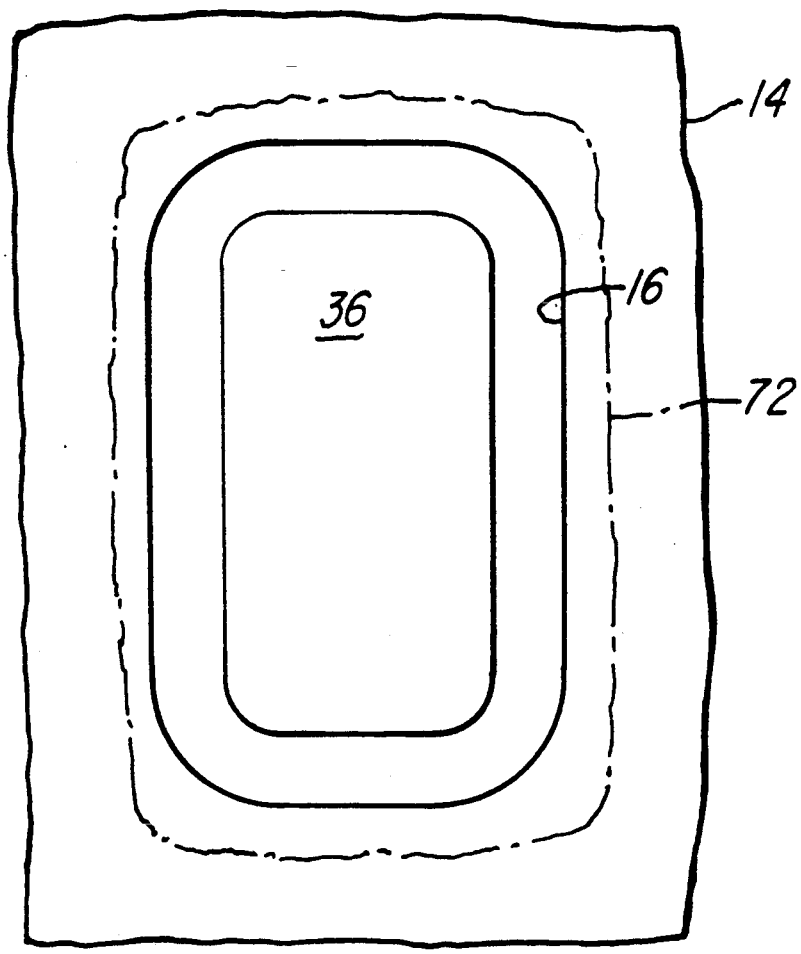

BRUSH CLEANING MECHANISM FOR SOAP MOLDING MACHINES

The present invention relates to improvements in cleaning the cavities of soap molding machines.

A well known type of molding machine comprises a multicavity mold which is incrementally rotated to successively register sets of mold cavities with a loading station, molding or pressing station, an unloading station and a cleaning station. The present invention is concerned with the cleaning station of this turret type machine.

In this type of soap molding machine, the mold cavities are in the nature of straight sided passageways, usually having a generally rectangular outline. Soap bar preforms are trimmed and inserted into the cavities at the loading station. The mold then rotates to bring these cavities to the pressing station, where they are compressed to a desired density and, in the usual case, a trademark identification is embossed therein. The next incremental rotation of the mold brings these cavities to the unloading station where the compressed bars of soap are displaced from the cavities for further processing. The empty cavities are then rotated to the cleaning station.

After the compressed bars of soap are unloaded from the mold cavities, there will be soap residue adhering to the walls of the cavities. Additionally, there can be loose scraps of soap in this cavity. It has long been recognized that the mold cavities must be free of soap residue when preforms are loaded thereon. If any such residue is present, it will cause disfiguration of soap bars subsequently compressed therein. These scraps and the adhering residue are removed at the cleaning station.

In prior art machines, a felt pad has been employed to obtain this cleaning function. Typically a felt pad, having a thickness of approximately ⅜ inch, is clamped between a pair of plates which have an outline slightly less than that of the die cavity. The felt pad is formed with an outline matching that of the die opening. The felt pad, so mounted, is reciprocated into and out of the die opening. The side surfaces of the felt pad wipe the die cavity surface, thereby removing soap residue and soap scraps.

This approach has been effective in providing the required cleaning function. However, it has a serious drawback in that the wiping surfaces of the pads become matted and lose their effectiveness as a cleaning mechanism, in a relatively short period of time. Thus there is not only the inconvenience of frequent replacement of the felt pads, typically on a weekly basis, but also the loss of production involved in the shutting down the machine in order to replace felt pads.

It is also to be noted that the referenced soap molding machines are highly automated and operate at high production rates. Thus, when a felt pad loses its effectiveness, there can be a large number of defective soap bars produced before the need to replace the felt pads is recognized. This further contributes to the losses incident to the relatively short working life of the felt pads.

Accordingly, the object of the present invention is to provide more effective and reliable means for cleaning the mold cavities of a soap molding machine.

A further and related object of the present invention is to minimized the down time of soap molding machines, incident to replacing the cleaning means for these mold cavities.

Yet another object of the present invention is to attain the foregoing ends in a manner requiring a minimum modification of existing soap molding machines.

These means are broadly attained by substituting a brush for the cleaner plates previously employed in the referenced type of soap molding machine.

More specifically, the invention comprises a mold cleaning mechanism comprising a mold having a cavity extending therethrough. A mold cleaning element is registered with this cavity and is reciprocated between a rest position spaced from said mold and an extended position in which at least a portion of the mold cleaning element is extended through said cavity.

The mold cleaning element is a brush having bristles projecting from a mounting block. Preferably the brush comprises a block and a plurality of bristle plugs inserted into and projecting from said block. These bristles have an outline greater than the outline of the cavity. Thus, the bristles of the brush will be flexed to effectively clean soap residue from the cavity surface, when the brush is reciprocated between its rest and extended positions.

Further, it is preferred, in accordance with more specific aspects of the invention to form each plug of approximately 60 bristles, with the individual bristles being #14 nylon.

In accordance with further specific aspects of the invention, where the mold cavity outline has a width of approximately 2¼ inches and a height of approximately 3½ inches, the brush outline has a width of approximately 2⅝ and a height of approximately 4⅛ inches. With this configuration, the interference between the bristles and the cavity outline is between approximately 30% and 50% of the length of the bristles.

Another aspect of the invention is found in that the brush, in its extended position, is projected at least partially through and beyond the mold cavity. Additionally, at least a portion of the bristles are extended to an unflexed position, in the extended position of the brush, so that bristles will be flexed in an opposite direction when the brush is reciprocated back to its rest position.

The above and other related objects and features of the invention will be apparent from a reading of the following description of a preferred embodiment, with reference to the accompanying drawings, and the novelty thereof pointed out in the appended claims.

BRIEF DESCRIPTION OF THE DRAWINGS

FIG. 1 is a perspective view, with certain elements in exploded relation, of the portions of a soap molding machine pertinent to an understanding of the present invention;

FIG. 2 is a perspective view, on an enlarged scale, of a brush support member seen in FIG. 1;

FIG. 3 is an elevation, on a further enlarged scale, of a brush unit seen in FIGS. 1 and 2;

FIG. 4 is a section taken on line 4—4 in FIG. 3;

FIG. 5 is a side view, on an enlarged scale and partially in section, of actuating mechanism seen in FIG. 1;

FIG. 6 is a side view similar to FIG. 5 illustrating the actuating mechanism in an alternate position;

FIG. 9 is a view similar to FIG. 3 illustrating the relationship between the brush outline and the outline of a mold cavity.

DETAILED DESCRIPTION OF THE PREFERRED EMBODIMENT

Figure 7:
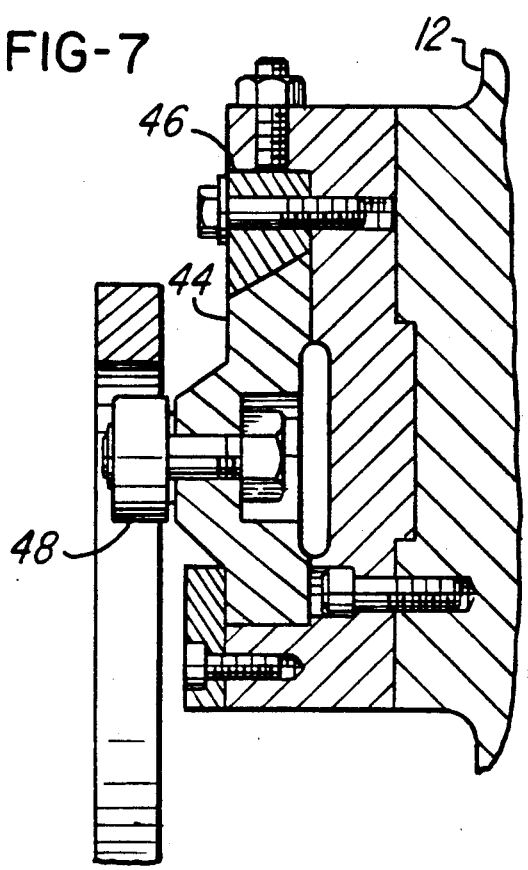
FIG. 7 is a section taken on line 7—7 in FIG. 5.

The present invention is illustrated as a modification of an existing soap molding machine, also known as a soap press, which is generally identified by reference character 10 in FIG. 1. The molding machine 10 comprises a frame structure 12 on which a mold 14 is mounted for rotation about a horizontal axis. The mold 14 has four sets of mold cavities 16 which, as illustrated, may simply be straight sided passageways through the mold 14. Each set of mold cavities, in turn, comprises four cavities 16.

The mold 14 is rotated in 90 deg. increments to successively bring each set of mold cavities to a loading station 18, a pressing station 20, an unloading station 22 and a cavity cleaning station 24.

Operation of the machine is in turret fashion. At the loading station 18, soap preforms, or slugs, P are automatically positioned in lateral registration with the cavities 16 and then trimmed and loaded into those cavities by means which include trimmers 26. At the pressing station 20, the previously loaded preforms are compressed by dies 28 (there would be a second set of similar dies on the opposite side of the mold 14). At the unloading station 22, the compressed bars of soap are displaced from the cavities 16 by pushers 30 and gripped by suction cups 32 which then transfer the bars to other mechanism for further processing. At the cleaning station 22, brushes 34 brushes remove any soap scraps or residue from the mold cavities 16.

The mechanisms employed at the loading station 18, the pressing station 20 and the unloading station 22 are well known in the prior art, being the mechanisms provided in an existing machine available from Company G. Mazzoni, S.P.A., Busto Arsizio, Italy.

The present invention is directed to improvements embodied in the cleaning station 24 and more particularly to the brushes 34. Each brush comprises a central block 36 (See also FIGS. 2 and 5) which is secured by screws 38 to a stem 40 projecting from a support bar 42. The support bar 42 is mounted on a slide 44 is reciprocably mounted in a guideway 46, secured to the frame 12. A roller 48 is mounted on the slide 44 and received in a closed cam slot 50 formed in a cam plate 52 (Additional reference is made to FIG. 7). The cam plate 52 is mounted on a shaft 54 which is journaled on the frame structure 12. A lever 56 is also secured to the shaft 54 and connected by a link 58 (FIG. 1) and a further lever 59 to a shaft 60.

The components sequentially described from the stems 40 through the shaft 60 are likewise components found in said existing machine. The shaft 60 oscillates in proper timed relation to incremental rotation of the mold 14 to reciprocate the brushes 34 to provide an improved cleaning function, all in a manner now to be specifically described.

At the start of each cycle of incremental rotation of the mold 14, the brushes 34 are in a rest position, spaced rearwardly of the mold 14, as illustrated in FIG. 5. When this cycle is initiated, the shaft 60 rotates in a counterclockwise direction, causing the cam plate 52 to likewise rotate in a clockwise direction (FIG. 1). The cam 50 has a dwell portion so that the slide 44 remains stationary during the initial rotation of the cam plate 52. After this initial rotation is completed, the cam 50 displaces the slide 44 and, thus, the brushes 34 outwardly. The brushes 34 are respectively registered with the set of cavities 16 at the cleaning station 22. The brushes 34 are thus projected through this set of cavities 16 to the position illustrated in FIG. 6, which position is at the extreme of counterclockwise movement of the cam plate 52. Thereafter, the shaft oscillates to rotate in a clockwise direction, causing the cam plate 52 to also rotate in a clockwise direction and retract the brushes to the rest position of FIG. 5.

The brushes 34 provide a superior means of cleaning the surfaces of the mold cavities 16. The brushes 34 have a wear life greatly exceeding that of the prior felt wiper pads. Thus, while there is a need to periodically replace the brushes 34, the frequency is much less than with felt pads and, consequently, down time and production losses are greatly minimized.

These superior results are further attributable to the characteristics of the brushes 34 and the features now to be described.

Figure 8:
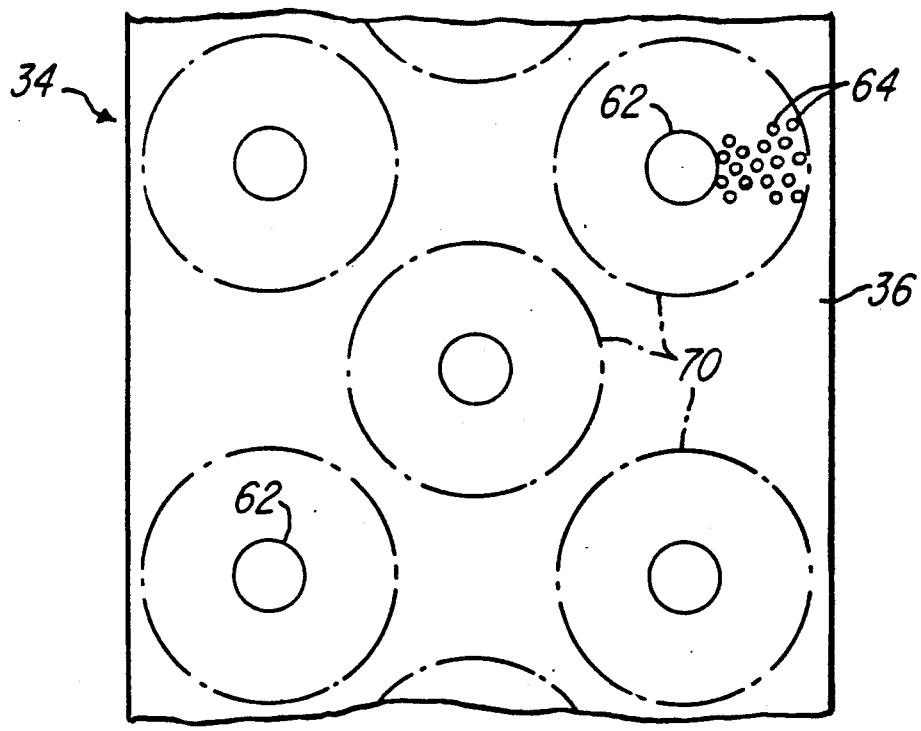
FIG. 8 is a view, on an enlarged scale of the ends of bristle plugs employed in the present brush.

It will be first noted that each brush 34 comprises a plurality of plugs 62 comprising bristles 64 (FIGS. 3, 4 and 8). A preferred bristle material is a #14 white level nylon. It has been found that a bush formed with plugs 62 comprising approximately 60 bristles 64 of #14 white level nylon provides an effective cleaning action. These plugs are inserted into holes 66 having a preferred diameter of approximately $\frac{1}{8}$ in. Preferably the plugs 62 are drawn into the block by #302-18 gauge stainless steel wire.

There is a natural tendency for the bristles of a plug to angle outwardly from the hole into which it inserted. This is illustrated in FIG. 8, where the broken line circles 70 identify the areas covered by the outer ends of the bristles 64 of each plug 62. It will be seen that the circles 70 overlap so that, across the width of the brush, on its outer surface, there will be bristle ends which engage the surface of a mold cavity, to effect a cleaning action. It will also be noted that the ends of the bristles of one plug are preferable spaced from the bristle ends of adjacent plugs, as illustrated by the spacing between adjacent, broken circles 70.

Reference is next made to FIG. 9, in which the front elevation of the outer ends of the bristles 64 is indicated by a broken line 72. The outline of the unflexed, brush bristles is in its registered relation with a die cavity 16. It will be seen that the outline of the brush, in all directions extends beyond the outline of the cavity, so that the bristles will have to be deflected when the brush is inserted into the cavity. This is also illustrated in FIG. 6. As will be seen, where the outline of the cavity 16 is generally rectangular, the bristles 64, at the corners of the brush will have a length somewhat longer than bristles defining its side surfaces.

There is, thus, an interference between the bristles and the die cavity. This interference should be at least sufficient to flex the bristle ends so that they provide a scrubbing action on the die cavity surface. Preferably, the interference, i.e., the difference between the brush outline and the cavity outline, should be limited to a dimension that permits some of the bristles to spring to an unflexed position, when the brush is in its fully projected position, as seen in FIG. 6.

It has been found, for purposes of the present invention, for a cavity outline having a width of approximately $2\frac{1}{4}$ inches and a height of approximately $3\frac{1}{2}$ inches, a brush outline having a width of approximately $2\frac{5}{8}$ and a height of approximately $4\frac{1}{8}$ inches provides an effective scrubbing action. This effective cleaning action is further derived with the use of bristle plugs 62, as above characterized. Additionally, the length of the bristles is approximately ⅝ inch along the side surfaces of the brush and approximately 7/8 inch at the corners.

Characterized in a different fashion, the interference between the bristles 64 and the adjacent outline of the cavity opening may vary between approximately 30% and 50%.

Variations in the described embodiment will occur to those skilled in the art within the spirit of the present inventive concepts, and are to be included within the scope of the following claims.

Having thus described the invention, what is claimed as novel and desired to be secured by Letters Patent of the United States is:

1. In a soap mold cleaning mechanism comprising
   a mold having a cavity with a closed outline and defined by wall surfaces extending through said mold,
   a mold cleaning element registered with said cavity,
   means for reciprocating said cleaning element between a rest position spaced from said mold and an extended position in which at least a portion of the mold cleaning element is extended through said cavity,
   the improvement wherein
   the mold cleaning element is a non-rotating brush having bristles projecting from a mounting block, and
   said bristles have an outline sufficiently greater than the outline of the cavity, for the bristles of the brush to be flexed and effectively clean soap residue from the cavity wall surfaces, when the brush is reciprocated between its rest and extended positions.

2. A soap mold cleaning mechanism as in claim 1, wherein
   the brush comprises
   a block and
   a plurality of bristle plugs inserted into and projecting from said block
   each plug comprising a plurality of bristles projecting generally in a direction normal to that of the reciprocable movement of the cleaning element.

3. A soap mold cleaning mechanism as in claim 2 wherein
   each plug comprises approximately 60 bristles and the individual bristles are #14 nylon.

4. A soap mold cleaning mechanism as in claim 3 wherein
   the mold cavity outline has a width of approximately 2¼ inches and a height of approximately 3½ inches, and
   the brush outline has a width of approximately 2⅝ inches and a height of approximately 4⅛ inches.

5. A soap mold cleaning mechanism as in claim 3 wherein
   the interference between the bristles and the cavity outline is between approximately 30% and 50% of the length of the bristles.

6. A soap mold cleaning mechanism as in claim 1 wherein
   the brush, in its extended position, is projected at least partially through and beyond the mold cavity.

7. A soap mold cleaning mechanism as in claim 6 wherein
   at least a portion of the bristles are extended to an unflexed position in the extended position of the brush, whereby such bristles will be flexed in an opposite direction when the brush is reciprocated back to its rest position.

* * * * *